United States Patent
Furusawa et al.

(10) Patent No.: US 8,815,458 B2
(45) Date of Patent: Aug. 26, 2014

(54) FUEL CELL SYSTEM AND METHOD FOR CONTROLLING STOPPAGE OF FUEL CELL SYSTEM

(75) Inventors: Koichiro Furusawa, Wako (JP); Kentaro Nagoshi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 563 days.

(21) Appl. No.: 13/048,898

(22) Filed: Mar. 16, 2011

(65) Prior Publication Data
US 2011/0236780 A1 Sep. 29, 2011

(30) Foreign Application Priority Data
Mar. 29, 2010 (JP) ................... 2010-074315

(51) Int. Cl.
*H01M 8/04* (2006.01)
(52) U.S. Cl.
USPC ........... 429/429; 429/427; 429/428; 429/432; 429/443
(58) Field of Classification Search
CPC ............. H01M 8/04231; H01M 8/04238; H01M 8/04388; H01M 8/04559; H01M 8/04567; H01M 8/0488
USPC ................... 429/427–429, 432, 443
See application file for complete search history.

(56) References Cited

U.S. PATENT DOCUMENTS

2006/0093880 A1* 5/2006 Igarashi et al. ................. 429/22

FOREIGN PATENT DOCUMENTS

| JP | 08-138709 | 5/1996 |
|---|---|---|
| JP | 2007-026843 | 2/2007 |
| JP | 2007-141779 | 6/2007 |
| JP | 2007-258117 | 10/2007 |
| JP | 2007-288850 | 11/2007 |
| JP | 2008-171677 | 7/2008 |
| JP | 2010-129245 | 6/2010 |

OTHER PUBLICATIONS

Japanese Office Action for corresponding JP Application No. 2010-074315, Mar. 13, 2012.

* cited by examiner

*Primary Examiner* — Milton I Cano
*Assistant Examiner* — Ling R Zeng
(74) *Attorney, Agent, or Firm* — Mori & Ward, LLP (57) ABSTRACT

A fuel cell system for a vehicle includes a fuel cell, a fuel supply device, an oxidizer supply device, an anode potential measuring device, and a discharge controller. The anode potential measuring device is configured to measure an anode potential of an anode. The discharge controller is configured to control discharge of electric current from the fuel cell as part of a process of stopping the fuel cell during idling of the vehicle. When receiving idle stop permission for the fuel cell, the discharge controller determines whether the fuel cell is permitted to discharge. When the anode potential is equal to or lower than a predetermined threshold value, the discharge controller permits the fuel cell to discharge. When the anode potential is higher than the predetermined threshold value, the discharge controller does not permit the fuel cell to discharge.

10 Claims, 8 Drawing Sheets

FUEL CELL SYSTEM AND METHOD FOR CONTROLLING STOPPAGE OF FUEL CELL SYSTEM

CROSS-REFERENCE TO RELATED APPLICATIONS

The present application claims priority under 35 U.S.C. §119 to Japanese Patent Application No. 2010-074315 filed Mar. 29, 2010, entitled "Fuel Cell System and Method for Controlling Stop of Fuel Cell System". The contents of this application are incorporated herein by reference in their entirety.

BACKGROUND OF THE INVENTION

1. Field of the Invention

The present invention relates to a fuel cell system and a method for controlling the stoppage of the fuel cell system.

2. Description of the Related Art

Known fuel cells mounted in fuel cell vehicles include a fuel cell stack including flat unit fuel cells (hereinafter, referred to as "unit cells") each configured such that a polymer electrolyte membrane is sandwiched between an anode and a cathode to form a membrane electrode assembly (MEA) and the MEA is disposed between two separators. In each fuel cell, hydrogen is supplied as an anode gas (fuel) to the anode and air is supplied as a cathode gas (oxidizer) to the cathode. Hydrogen ions generated by catalytic reaction at the anode permeate through the electrolyte membrane to the cathode. The hydrogen ions electrochemically react with oxygen in the air at the cathode ($O_2+4H^++4e^-\rightarrow 2H_2O$), thus generating electricity.

In the above-described fuel cell, during stopping of a vehicle, particularly, while an idle stop is performed (i.e., the fuel cell is temporarily stopped), a discharge process for consuming hydrogen remaining in the fuel cell may be performed in order to prevent hydrogen from being diffused (crossover) and being then discharged to a diluter on the next start-up.

In some cases, however, it is better that the discharge process should not be performed depending on the internal state of the fuel cell. For example, the anode gas may not be delivered to the entire surface of the fuel cell (unit cell) because of, for example, a flooding phenomenon, in which water produced by electricity generation locally accumulates in the fuel cell to interfere with the supply of the anode gas, or a blockage in a flow passage for the anode gas. If the discharge process is performed in such a state, the anode gas lacks relative to a requested electric current to be generated (a lack of balance in stoichiometry which will be described later). Disadvantageously, this leads to degradation of the polymer electrolyte membrane of the fuel cell.

Japanese Unexamined Patent Application Publication No. 2007-258117 discloses a system in which a voltage (cell voltage) parameter threshold value is calculated on the basis of information indicating a load just before an idle stop and the parameter threshold value is compared to a measured voltage parameter to determine whether to permit the idle stop.

SUMMARY OF THE INVENTION

According to one aspect of the present invention, a fuel cell system for a vehicle includes a fuel cell, a fuel supply device, an oxidizer supply device, an anode potential measuring device, and a discharge controller. The fuel cell has an anode and a cathode. The fuel supply device is to supply a fuel to a fuel flow passage facing the anode. The oxidizer supply device is to supply an oxidizer to an oxidizer flow passage facing the cathode. The anode potential measuring device is configured to measure an anode potential of the anode. The discharge controller is configured to control discharge of electric current from the fuel cell as part of a process of stopping the fuel cell during idling of the vehicle. When receiving idle stop permission for the fuel cell, the discharge controller determines whether the fuel cell is permitted to discharge. When the anode potential measured by the anode potential measuring device is equal to or lower than a predetermined threshold value, the discharge controller permits the fuel cell to discharge. When the anode potential measured by the anode potential measuring device is higher than the predetermined threshold value, the discharge controller does not permit the fuel cell to discharge.

According to another aspect of the present invention, a method for controlling stoppage of a fuel cell system for a vehicle includes supplying a fuel to a fuel flow passage facing an anode of a fuel cell. An oxidizer is supplied to an oxidizer flow passage facing a cathode of the fuel cell. An anode potential of the anode is measured. Discharge of electric current from the fuel cell is controlled as part of a process of stopping the fuel cell during idling of the vehicle. It is determined whether the fuel cell is permitted to discharge when receiving idle stop permission for the fuel cell. The fuel cell is permitted to discharge when the anode potential is equal to or lower than a predetermined threshold value. It is prohibited that the fuel cell discharges when the anode potential is higher than the predetermined threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments of the present invention will be described below with reference to the drawings, wherein like reference numerals designate corresponding or identical elements throughout the various drawings.

Fuel Cell System

Figure 1:
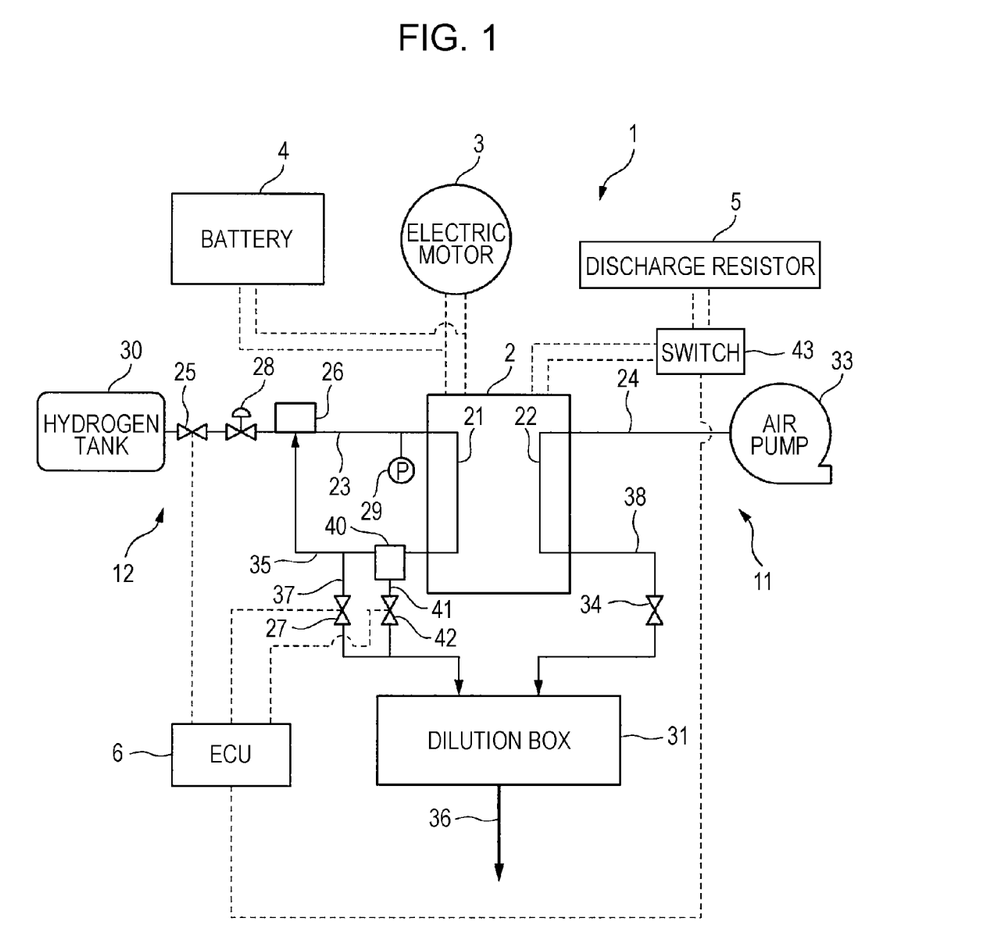
FIG. 1 is a diagram illustrating the schematic configuration of a fuel cell system according to an embodiment of the present invention.

FIG. 1 illustrates the schematic configuration of a fuel cell system.

Referring to FIG. 1, the fuel cell system, indicated at 1, is mounted on a fuel cell vehicle (not illustrated) and mainly includes a fuel cell stack (hereinafter, referred to as "fuel cells") 2, a cathode gas supply unit (oxidizer supply unit) 11 supplying air as a cathode gas (oxidizer) to the fuel cells 2, an anode gas supply unit (fuel supply unit) 12 supplying hydrogen as an anode gas (fuel) to the fuel cells 2, and an ECU 6 controlling the above-described components in a centralized manner.

The fuel cells 2 generate electricity by electrochemical reaction of the anode gas and the cathode gas and each include an electrolyte membrane. This electrolyte membrane is sandwiched between the anode and the cathode to form an MEA. This MEA is disposed between two separators, thus forming a cell. Such cells are stacked, thus forming the fuel cells 2. Hydrogen is supplied as the anode gas to the anode of each fuel cell 2 and air is supplied as the cathode gas to the cathode thereof. Hydrogen ions generated by catalytic reaction at the anode permeate through the electrolyte to the cathode and the hydrogen ions electrochemically react with oxygen at the cathode, thus generating electricity. The fuel cell system 1 includes a temperature detecting unit (not illustrated) detecting a temperature of each fuel cell 2.

The cathode gas supply unit 11 includes an air pump 33 that sucks in air which is supplied from a cathode-gas supply source (not illustrated) or the air as the cathode gas, pressurizes the air at a predetermined pressure, and delivers the pressurized air to the fuel cells 2. The air pump 33 is connected through a cathode gas supply line 24 to a cathode gas flow passage 22 that faces the cathodes at an entrance to the fuel cells 2. At an exit from the fuel cells 2, the cathode gas flow passage 22 is connected to a cathode off-gas discharge line 38 through which a cathode off-gas and water produced upon electricity generation by the fuel cells 2 flow.

The anode gas supply unit 12 includes a hydrogen tank 30 filled with the anode gas. The hydrogen tank 30 is connected through an anode gas supply line 23 to an anode gas flow passage (fuel flow passage) 21 that faces the anodes at an entrance to the fuel cells 2. At an exit from the fuel cells 2, the anode gas flow passage 21 is connected to an anode off-gas discharge line 35 through which an anode off-gas produced upon electricity generation by the fuel cells 2 flow.

The anode gas supply line 23 is connected to a shut-off valve 25, a regulator 28, and an ejector 26 in that order from the upstream side. A pressure sensor 29 is provided for a downstream portion of the anode gas supply line 23 (adjacent to the entrance to the fuel cells 2) so that an anode gas pressure (gauge pressure) in the anode gas supply line 23 can be detected.

The shut-off valve 25 is of an electromagnetically driven type and is configured to be capable of shutting off the supply of the anode gas from the hydrogen tank 30.

The regulator 28 regulates (reduces) the pressure of the high-pressure hydrogen gas supplied from the hydrogen tank 30 at a value in a predetermined range depending on a signal pressure corresponding to a pressure of the cathode gas supplied to the fuel cells 2. Accordingly, the difference in pressure between the cathode and the anode of each fuel cell 2 is held at a predetermined pressure. The anode gas regulated by the regulator 28 is supplied through the ejector 26 to the fuel cells 2.

The anode off-gas discharge line 35, which is connected to the ejector 26, is configured to circulate an anode off-gas discharged from the fuel cells 2 so that the anode off-gas can be reused as the anode gas for the fuel cells 2. The anode off-gas discharge line 35 includes a purge gas discharge line 37, serving as a branch extending from the anode off-gas discharge line 35. The purge gas discharge line 37 is connected to a dilution box 31. The purge gas discharge line 37 is provided with an electromagnetically driven purge valve 27.

The anode off-gas discharge line 35 is provided with a catch tank 40. The catch tank 40 is configured to separate a liquid (produced water) contained in the anode off-gas from the anode off-gas flowing through the anode off-gas discharge line 35 and store only the produced water. The catch tank 40 is connected to a produced water discharge line 41. The produced water discharge line 41, which is connected to the dilution box 31, is configured to discharge the produced water stored in the catch tank 40 to the outside of the fuel cell vehicle through the dilution box 31. The produced water discharge line 41 is provided with an electromagnetically driven drain valve 42.

The air (cathode gas) pressurized by the air pump 33 passes through the cathode gas supply line 24 and is then supplied to the cathode gas flow passage 22 of the fuel cells 2. Oxygen in the cathode gas is used as an oxidizer for electricity generation. After that, the resultant gas is discharged as a cathode off-gas from the fuel cells 2 to the cathode off-gas discharge line 38. The cathode off-gas discharge line 38 is connected to the dilution box 31. The cathode off-gas is discharged to the outside of the vehicle. The cathode off-gas discharge line 38 is provided with a back pressure valve 34 configured to regulate a pressure of the cathode gas (hereinafter, "cathode gas pressure") in the cathode gas flow passage 22 of the fuel cells 2.

The dilution box 31 includes a residence chamber in which the anode off-gas introduced from the purge gas discharge line 37 is allowed to reside. This residence chamber is connected to the cathode off-gas discharge line 38. Specifically, the anode off-gas is diluted with the cathode off-gas in the residence chamber and the resultant gases are discharged to the outside of the vehicle through a discharge path 36. The cathode off-gas is supplied to the dilution box 31 on the basis of the concentration of the anode off-gas introduced from the purge gas discharge line 37.

The fuel cells 2 are connected to an electric motor 3, which is used for driving the fuel cell vehicle. Generated electric power drawn from the fuel cells 2 is supplied to the electric motor 3. The fuel cells 2 are further connected to a battery 4 so that excess electric power which is not used in the electric motor 3 can be stored.

The fuel cells 2 are connected to a discharge resistor 5 through a switch 43. The discharge resistor 5 is configured to prevent the fuel cells 2 from degrading by exposure to high potential (high cathode potential). The discharge resistor 5 is connected to or disconnected from the fuel cells 2 in accordance with turning on or off of the switch 43. Since the fuel cells 2 are connected to the discharge resistor 5, electric current is drawn (discharged) from the fuel cells 2.

Each of the fuel cells 2 is connected to a reference electrode (anode potential measuring unit), which is not illustrated. The reference electrode is configured to measure a potential of the anode (hereinafter, "anode potential") on the basis of the potential of hydrogen, serving as a reference potential (0 V). As for the reference electrode, for example, a dynamic hydrogen electrode (DHE) is used. The reference electrode is disposed every predetermined number of cells of the fuel cells 2. ECU FIG. 2 is a block diagram of the ECU.

Figure 2:
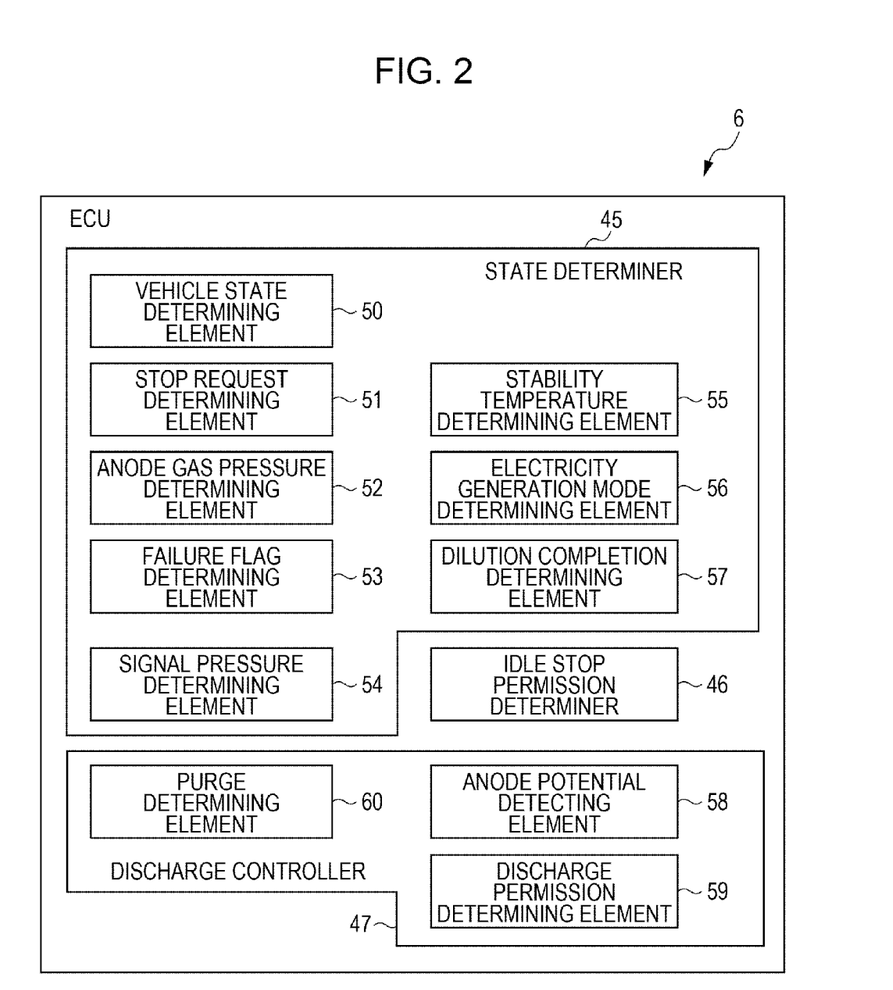
FIG. 2 is a system block diagram of an electric control unit (ECU)

Referring to FIG. 2, the ECU 6, which controls the components of the fuel cell system 1 in a centralized manner, includes a sate determiner 45, an idle stop permission determiner 46, and a discharge controller 47. The sate determiner 45 determines a state of each fuel cell 2. The idle stop permission determiner 46 determines, on the basis of a result of determination by the sate determiner 45, whether to permit an idle stop. The discharge controller 47 determines, on the basis of a result of determination by the idle stop permission determiner 46, whether to perform a discharge process of the fuel cells 2.

The sate determiner 45 includes a vehicle state determining element 50, a stop request determining element 51, an anode gas pressure determining element 52, a failure flag determining element 53, a signal pressure determining element 54, a stability temperature determining element 55, an electricity generation mode determining element 56, and a dilution completion determining element 57.

The vehicle state determining element 50 determines an operation state of the fuel cell vehicle. The vehicle state determining element 50 determines the presence of an idle stop request when the vehicle is stopped because, for example, a brake pedal is pressed, an accelerator pedal is not pressed, or the vehicle speed is at zero while the ignition is turned on (the fuel cell system 1 is operating). An idle stop button or the like may be provided for the fuel cell system 1 and the vehicle state determining element 50 may determine, on the basis of ON or OFF of the idle stop button, the presence or absence of an idle stop request.

The stop request determining element 51 determines, on the basis of energy management (the state of charge (SOC) of the battery 4), whether an idle stop can be performed.

The anode gas pressure determining element 52 determines whether a pressure of the anode gas (hereinafter, referred to as an "anode gas pressure") detected by the pressure sensor 29 is at or below a predetermined value.

The failure flag determining element 53 determines whether the pressure sensor 29 fails. Specifically, the failure flag determining element 53 compares an anode gas pressure detected by the pressure sensor 29 with a reference anode gas pressure indicated by the pressure sensor 29 under normal operating conditions to determine whether the pressure sensor 29 fails.

The signal pressure determining element 54 determines whether a pressure of the cathode gas (hereinafter, referred to as a "cathode gas pressure") is at or below a predetermined value.

The stability temperature determining element 55 determines a temperature of each fuel cell 2 detected by the above-described temperature detecting unit (not illustrated) has reached an operating temperature (for example, approximately 80° C.) of the fuel cell 2 under normal operating conditions. In other words, during idle stop permission determination, the stability temperature determining element 55 eliminates a state where a temperature of each fuel cell 2 does not reach the operating temperature under normal operating conditions, for example, a case where the fuel cells 2 are being warmed up.

The electricity generation mode determining element 56 determines, on the basis of the temperature of each fuel cell 2 detected by the temperature detecting unit, whether the electricity generation mode of the fuel cell system 1 is a normal electricity generation mode or a low-temperature-activation electricity generation mode.

The dilution completion determining element 57 determines, on the basis of the amount (concentration) of the cathode gas remaining in the fuel cells 2 and that of the anode gas remaining therein, whether dilution is completed. Specifically, when the sum of the rates of flow of the cathode gas remaining in the fuel cells 2 is zero (the air pump 33 is stopped), the dilution completion determining element 57 determines whether the anode gas remaining in the fuel cells 2 can be diluted at a predetermined hydrogen concentration (i.e., such a concentration that the diluted anode gas can be discharged).

The idle stop permission determiner 46 determines, on the basis of the results of determination by the above-described sate determiner 45, whether to perform an idle stop.

The discharge controller 47 is configured to, when the idle stop permission determiner 46 permits an idle stop and the idle stop is performed, determine whether to perform a discharge process. The discharge controller 47 includes an anode potential detecting element 58, a discharge permission determining element 59, and a purge determining element 60.

The anode potential detecting element 58 detects an anode potential measured by each reference electrode described above.

The discharge permission determining element 59 determines, on the basis of each anode potential detected by the anode potential detecting element 58, whether to permit the discharge process. Specifically, the discharge permission determining element 59 stores an anode potential threshold value Vandown used for determining whether to permit the discharge process and compares each anode potential Van detected by the anode potential detecting element 58 with the anode potential threshold value Vandown. In the present embodiment, the anode potential threshold value Vandown is set to be lower than a potential (degradation start potential V') at which the degradation of the fuel cells 2 starts.

The purge determining element 60 purges the anode gas flow passage 21 when the discharge permission determining element 59 does not permit the discharge process (the anode potential is high). The term "purge" means that the anode gas pressure in the anode gas flow passage 21 is raised and the purge valve 27 is then opened to discharge an impurity gas, such as nitrogen. In the present embodiment, if the discharge permission determining element 59 does not permit the discharge process, a purge increasing mode where a pressure is raised to a value higher than that for normal purge is performed so that produced water residing in the anode gas flow passage 21 is also blown off.

Method for Controlling Stop of Fuel Cell System

Figure 3:
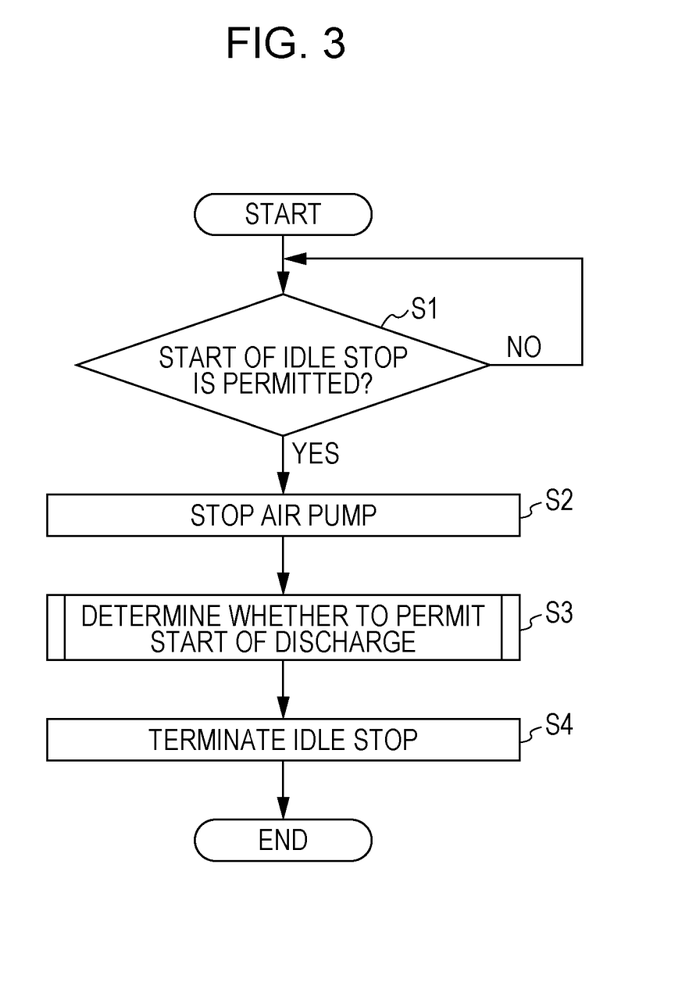
FIG. 3 is a flowchart illustrating a method for controlling the stop of the fuel cell system.
Figure 4:
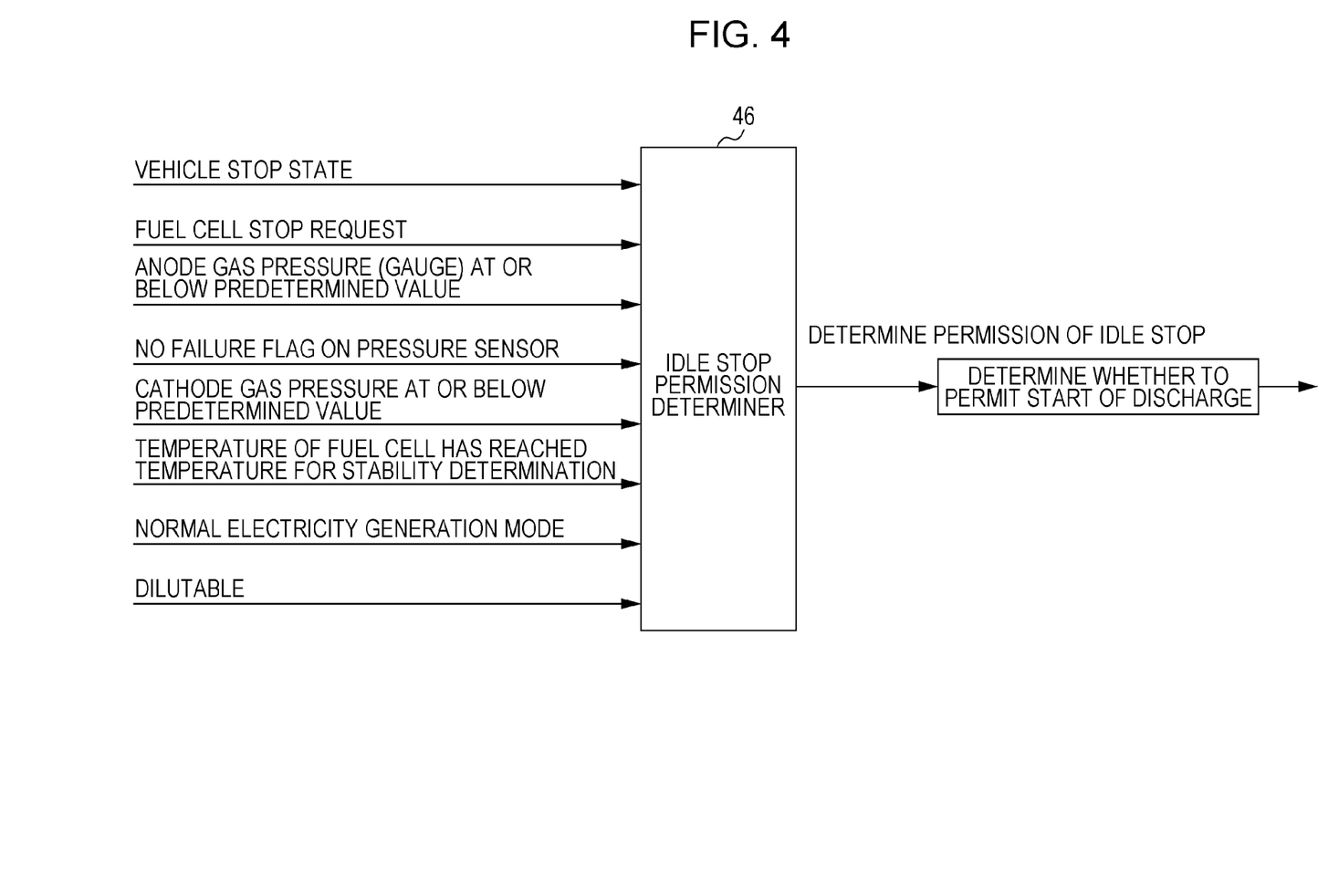
FIG. 4 is a diagram explaining conditions for determination as to whether to permit an idle stop (hereinafter, also referred to as "idle stop permission determination")

A method for controlling the stop of the above-described fuel cell system 1 will be described below. FIG. 3 is a flowchart illustrating a main routine of the method for controlling the stop of the fuel cell system. FIG. 4 is a diagram illustrating conditions for idle stop permission determination.

Referring to FIG. 3, the idle stop permission determiner 46 in the ECU 6 determines whether to permit an idle stop (step S1). Specifically, the idle stop permission determiner 46 permits the start of the idle stop when all of the following conditions, illustrated in FIG. 4, related to the results of determination by the sate determiner 45 are satisfied.

(1) The vehicle state determining element 50 determines, on the basis of ON of the ignition, that the vehicle is stopped (vehicle stop state).

(2) The stop request determining element 51 determines the presence of an idle stop request for the fuel cell vehicle.

(3) The anode gas pressure determining element 52 determines that the anode gas pressure is at or below the predetermined value.

(4) The failure flag determining element 53 determines that the pressure sensor 29 is under normal operating conditions.

(5) The signal pressure determining element 54 determines that the cathode gas pressure is at or below the predetermined value.

(6) The stability temperature determining element 55 determines that the temperature of each fuel cell 2 has reached the operating temperature under normal operating conditions.

(7) The electricity generation mode determining element 56 determines that the electricity generation mode of the fuel cell system is the normal electricity generation mode.

(8) The dilution completion determining element 57 determines that the anode gas remaining in the fuel cells 2 can be diluted at the predetermined hydrogen concentration.

Again referring to FIG. 3, if YES in step S1 (i.e., all of the above-described conditions (1) to (8) are satisfied), the start of the idle stop is permitted.

Whereas, if NO in step S1 (i.e., at least one of the above-described conditions (1) to (8) is not satisfied), the start of the idle stop is not permitted. The above-described determination in step S1 is periodically repeated.

When the start of the idle stop is permitted, the air pump 33 is stopped in step S2. Thus, the idle stop of the fuel cell system 1 is started. The idle stop involves stopping the air pump 33, so that pump operating sound and vibration can be reduced and the power consumption can also be reduced to improve fuel efficiency. Thus, saleability can be improved.

In step S3, the discharge controller 47 determines whether to perform the start of a discharge process.

Figure 5:
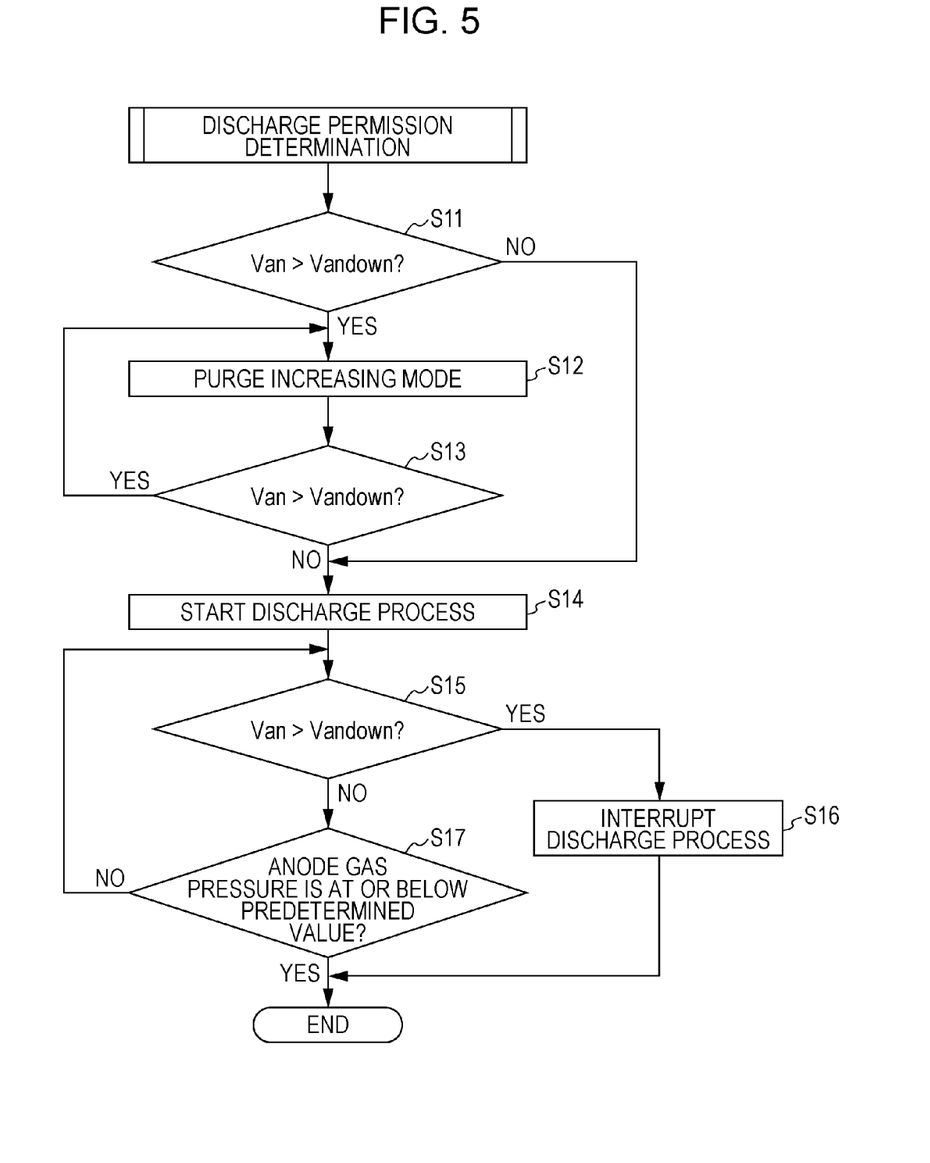
FIG. 5 is a flowchart illustrating discharge permission determination.

FIG. 5 is a flowchart explaining the discharge permission determination.

Referring to FIG. 5, in step S11, the discharge permission determining element 59 determines whether each anode potential Van detected by the anode potential detecting element 58 is higher than the anode potential threshold value Vandown.

If YES in step S11 (Van>Vandown), the anode potential may increase due to a lack of balance in stoichiometry as described above, thus causing degradation of the fuel cells 2 (the polymer electrolyte membranes). Accordingly, the discharge process is not performed at this time. The method proceeds to step S12.

Whereas, if NO in step S11 (Van≤Vandown), it is determined that the anode potential lies within a desired range (e.g., lower than the degradation start potential V') where the discharge process can be performed. The method proceeds to step S14, which will be described later.

In step S12, the above-described purge increasing mode is performed. Thus, produced water and the impurity gas residing in the anode gas flow passage 21 can be blown off. Thus, the flooding phenomenon or blockage of the anode gas flow passage can be prevented. Consequently, the anode gas can be delivered to the entire anode gas flow passage 21, thus recovering (reducing) the anode potential.

In step S13, the discharge permission determining element 59 again determines whether each anode potential Van at the completion of the purge increasing mode is higher than the anode potential threshold value Vandown.

If YES in step S13 (Van>Vandown), the discharge permission determining element 59 determines that the relevant fuel cell 2 may still be under the lack of balance in stoichiometry. Therefore, the process is returned to step S12. The purge increasing mode is again performed. After that, the determination in step S13 is made. Steps S12 and S13 are repeated until Van≤Vandown.

Whereas, if NO in step S13 (Van≤Vandown), the discharge permission determining element 59 determines that the anode potential is recovered and lies within the desired range. The method proceeds to step S14.

In step S14, the discharge process for the fuel cell system 1 is performed. Specifically, while the supply of the cathode gas is stopped, electricity (electric current) is drawn from the fuel cells 2. Methods for the discharge process include, for example, the following methods.

(1) The switch 43 connected to the discharge resistor 5 is turned on to connect the fuel cells 2 to the discharge resistor 5, thus consuming electricity generated by the fuel cells 2.

(2) While the discharge resistor 5 is not connected to the fuel cells 2, electricity generated by the fuel cells 2 is stored into the battery 4, supplied to the electric motor 3, consumed by the electric motor 3, or consumed by an electricity consuming device, such as an audio or a light.

Like the method (1), when electricity generated by the fuel cells 2 is consumed using the discharge resistor 5, discharge can be performed independently of the fuel cell system 1 without the amount of electricity stored in the battery 4 being monitored, for example.

In step S15, the discharge permission determining element 59 again determines whether the anode potential Van during the discharge process is higher than the anode potential threshold value Vandown. The reason is that the anode potential may further increase after the start of the discharge process. Specifically, for example, when the surface of each fuel cell 2 is large, an anode potential across the entire surface may not be completely measured by the reference electrode. In other words, if an increase of the anode potential cannot be determined in steps S11 and S13, for example, the flooding phenomenon may occur outside a detection area where the anode potential is measured by the reference electrode. If the discharge process is performed, produced water or the like residing outside the detection area of the reference electrode may move into the detection area and the anode potential in the detection area may increase.

In the present embodiment, therefore, in step S15, whether the anode potential increases is determined during the discharge process. Thus, the state of the surface of each of the fuel cells 2 can be detected with higher accuracy without increasing the number of reference electrodes.

If YES in step S15 (Van>Vandown), there may be a lack of balance in stoichiometry. The method proceeds to step S16, where the discharge process is interrupted. In this case, a subroutine for discharge permission determination is terminated at the time when the discharge process is interrupted.

If No in step S15 (Van≤Vandown), it is determined that the discharge process is adequately performed. The method proceeds to step S17.

In step S17, whether to permit the termination of the discharge process is determined. Specifically, when an anode gas pressure detected by the above-described pressure sensor 29 is at or below the predetermined value, it is determined that the discharge process is terminated.

If NO in step S17, it is determined that the anode gas pressure is not lowered to the predetermined value. The discharge process is continued. The determination in step S15 is repeated.

Whereas, if YES in step S17, it is determined that the anode gas pressure is lowered to or below the predetermined pressure. The discharge process is terminated. Thus, the subroutine for the discharge permission determination is terminated.

The determination as to whether to permit the termination of the discharge process may be made on the basis of the sum (total voltage) of voltages of all of the fuel cells 2. Specifically, when the total voltage is not lowered to a predetermined value, discharge is continued. If the total voltage is lowered to or below the predetermined value, the discharge is terminated.

Again referring to FIG. 3, when the discharge process in step S3 is terminated, the method proceeds to step S4.

In step S4, the idle stop is terminated. Specifically, when any of the above-described conditions (1) to (8) for the determination by the sate determiner 45 is not satisfied because, for example, the fuel cell vehicle starts running, the idle stop is terminated. If any of the conditions (1) to (8) for the determination by the sate determiner 45 is not satisfied during the above-described discharge permission determination, the idle stop is terminated at this time without the discharge process being not performed.

The process of controlling the stop of the fuel cell system 1 is terminated.

As described above, the fuel cell system 1 according to the present embodiment is configured to perform the discharge process of the fuel cells 2 when the anode potential Van of each anode is at or below the predetermined anode potential threshold value Vandown, and stops the fuel cells 2 without performing the discharge process when the anode potential Van is higher than the predetermined anode potential threshold value Vandown.

According to the present embodiment, whether to permit the discharge process is determined on the basis of the anode potential. Accordingly, the internal state (for example, whether a lack of balance in stoichiometry has occurred) of each fuel cell 2 can be detected with higher accuracy than the related-art system in which whether to permit the discharge process is determined on the basis of a cell voltage. In other words, a threshold value specific to the occurrence of a lack of balance in stoichiometry at the anode can be set for the determination as to whether to permit the discharge process. Thus, the determination as to whether to permit the discharge process can be made with high accuracy.

Since the determination as to permit the discharge process can be made with high accuracy to prevent the fuel cells 2 (polymer electrolyte membranes) from degrading, fuel consumption deterioration caused by the degradation of the fuel cells 2 can be prevented. In addition, the discharge process is performed during idle stop, so that the anode gas in the anode gas flow passage 21 is consumed, thus reducing the amount of anode gas crossover to the cathode. Consequently, the degradation of the fuel cells 2 can be appropriately prevented from progressing, thus preventing the fuel consumption deterioration.

When it is determined in step S11 that Van>Vandown, the discharge process is not performed. Accordingly, this may lead to degradation of the fuel cells 2 as described above.

The system according to the present embodiment is therefore configured so that, in the determination as to whether to permit the discharge process, the purge increasing mode is performed when it is determined in step S11 that Van>Vandown.

With this configuration, produced water and the impurity gas residing in the fuel cells 2 can be blown off by the anode gas, thus preventing the flooding phenomenon and delivering the anode gas to the entire surface of each fuel cell 2. Thus, the anode potential can be recovered (reduced) and the degradation of the fuel cells 2 can be appropriately prevented from progressing. After purge, the discharge permission determination is again made. Consequently, if it is determined that the anode potential Van is at or below the anode potential threshold value Vandown, rapid transition to the discharge process can be achieved.

While the embodiment of the present invention has been described in detail with reference to the drawings, it is to be understood that a specific configuration is not limited to the embodiment and modifications and variations can be made without departing from the spirit of the present invention.

For example, the case where the reference electrode is disposed every predetermined number of cells has been described in the above-described embodiment. The reference electrode may be disposed for each cell. Thus, the anode potential in each cell can be detected with high accuracy.

The case where the determinations (1) to (8) are simultaneously made by the idle stop permission determiner 46 in the above-described determination in step S1 has been described. The determination (1) may be first made and the determinations (2) to (8) may then be sequentially made.

In the above-described embodiment, the same anode potential threshold value Vandown is used in the steps of the discharge permission determination. Setting of the anode potential threshold value Vandown is not limited to the embodiment. The setting may be appropriately changed. In this case, it is preferable to set the anode potential threshold value Vandown in step S15 to be higher than that in step S11 and to be lower than the degradation start potential V'.

The case where an anode potential relative to the reference anode potential is directly measured using each reference electrode has been described in the above-described embodiment. The measurement is not limited to the embodiment.

Figure 8:
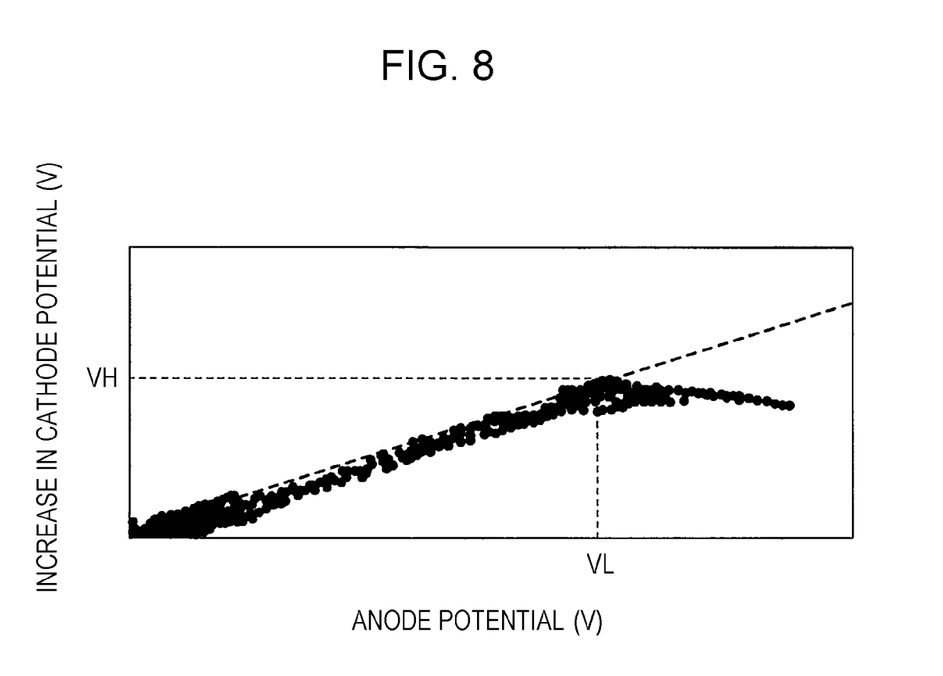
FIG. 8 is a graph illustrating an increase in the cathode potential plotted against the anode potential.

Specifically, while an anode potential lies within a range at or above a value VL as illustrated in FIG. 8, even if the anode potential increases, a cathode potential does not change. In other words, under a lack of balance in stoichiometry, electricity generation at the cathode is limited. When an increase in cathode potential relative to an increase in anode potential reaches a limit value VH, the cathode potential does not change and the anode potential alone increases. In such a state, a cell voltage, serving as the difference between the cathode potential and the anode potential, sharply decreases. The anode potential can be calculated on the basis of a decrease in cell voltage using the above-described phenomenon.

Figure 6:
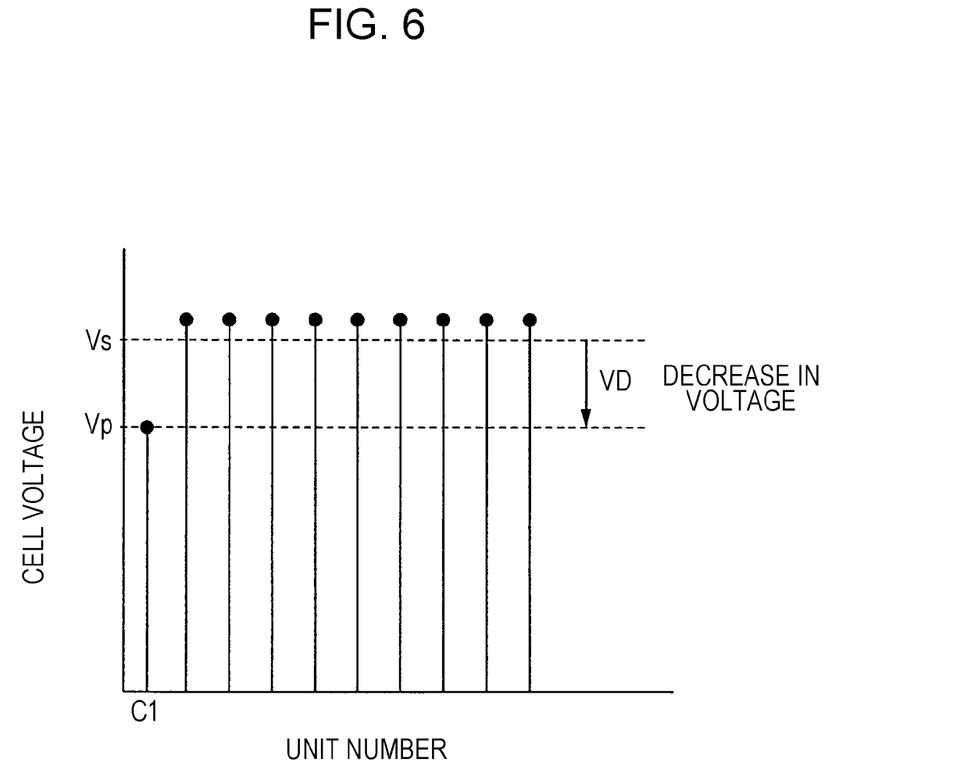
FIG. 6 is a graph illustrating cell voltages of cells.

FIG. 6 is a graph illustrating cell voltages of the cells.

As illustrated in FIG. 6, the cell voltages of the fuel cells 2 are first measured and an average cell voltage (the sum of the cell voltages of the cells/the number of stacked cells) Vs of the fuel cells 2 is calculated on the basis of the cell voltages. The difference between the calculated average cell voltage Vs and the cell voltage of each cell is obtained to calculate a decrease VD in voltage of the cell. A dashed line Vp indicates a cell voltage of a cell C1 in which the anode potential is high (there may be a lack of balance in stoichiometry).

The anode potential detecting element 58 is allowed to store a map indicating the relationship between a decrease VD in voltage and the corresponding anode potential. Specifically, the relationship between a decrease in cell voltage and an anode potential is calculated on the basis of the difference between the anode potential and the cathode potential in the above-described graph of FIG. 8 and is stored as a map. When a decrease VD in voltage is calculated, the anode potential Van is obtained on the basis of the calculated decrease VD in voltage. Then, whether to permit the discharge process is made on the basis of the anode potential obtained by the anode potential detecting element 58.

With this configuration, if an anode potential cannot be directly measured because, for example, the relevant reference electrode fails, the determination as to whether to permit the discharge process can be made with high accuracy.

The inventors of this application derived the following phenomenon associated with the relationship among a cell voltage, an anode potential, and a cathode potential from experiments.

Figure 7A:
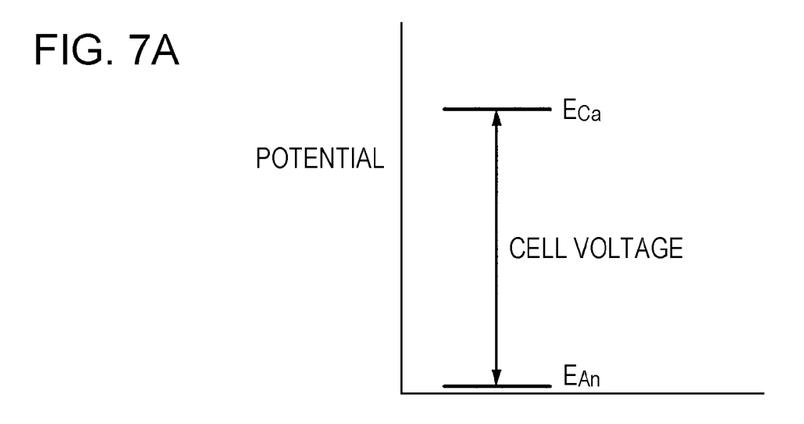
FIGS. 7A, 7B, and 7C are graphs illustrating the relationship among a cell voltage, an anode potential, and a cathode potential.
Figure 7B:
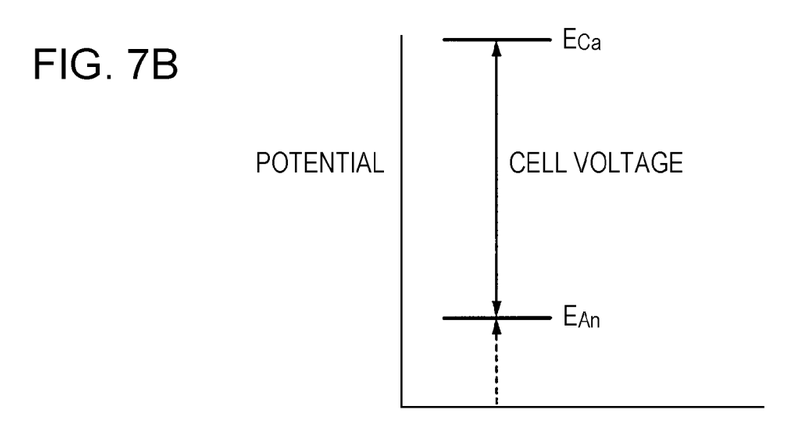
Figure 7C:
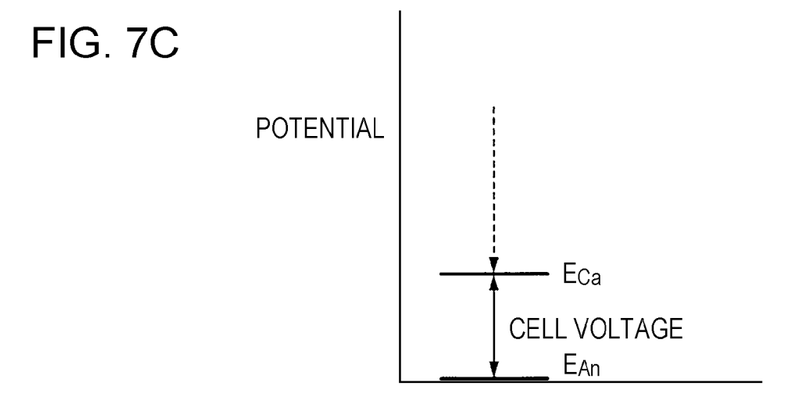

FIGS. 7A to 7C are graphs illustrating the relationship among the cell voltage, the anode potential, and the cathode potential.

As illustrated in FIG. 7A, the cell voltage is the difference between a potential of the anode and that of the cathode (cell voltage V=cathode potential $E_{Ca}$–anode potential $E_{An}$). The anode potential $E_{An}$ is approximately 0 V. Accordingly, the cell voltage V of the fuel cell under normal operating conditions has substantially the same value as the cathode potential $E_{Ca}$.

However, when the lack of balance in stoichiometry (the ratio of the quantity of reactive gas to be supplied to that to be consumed) occurs due to, for example, the above-described flooding phenomenon, electrons have to be drawn from the anode side irrespective of poor fuel. In this case, on the surface of the fuel cell, the occurrence of the flooding phenomenon causes a non-electricity generation area where electricity cannot be generated. In this area, the elution of a catalyst (e.g., platinum (Pt)) (Pt→$Pt_2^+$+2e$^-$) results in an increase in the anode potential when electrons are drawn from the anode, as illustrated in FIG. 7B.

On the other hand, in an electricity generation area where the flooding phenomenon does not occur, hydrogen ions permeating from the anode electrochemically react with oxygen at the cathode, so that the cathode potential is also increased.

FIG. 8 is a graph illustrating an increase in the cathode potential plotted against the anode potential.

Specifically, as understood from FIG. 8, when the anode potential increases due to the lack of balance in stoichiometry, the cathode potential increases at a predetermined rate relative to that of the anode potential (i.e., at a rate approximately 0.8 times as fast as the anode potential). Accordingly, when the lack of balance in stoichiometry occurs at the anode, the cell voltage decreases.

However, when the lack of balance in stoichiometry occurs at the cathode, the cathode potential decreases, so that the cell voltage decreases as illustrated in FIG. 7C. As a result, it is difficult to accurately grasp the internal state of the fuel cell on the basis of only a decrease in the cell potential.

According to the embodiment of the present invention, whether to permit the discharge is made on the basis of the anode potential. Thus, the internal state (e.g., the occurrence of flooding) of the fuel cell can be more accurately detected than the case where whether to permit the discharge is made on the basis of the cell voltage as in the related art. In other words, in the discharge permission determination, a threshold value specific to the occurrence of the lack of balance in stoichiometry at the anode can be set. Advantageously, the discharge permission determination can be made with high accuracy.

Therefore, the high-accuracy determination as to whether to permit the discharge can prevent degradation of the fuel cell (polymer electrolyte membrane). In addition, a discharge process is performed during an idle stop, thus consuming the fuel in the fuel flow passage to reduce the amount of fuel crossover to the cathode.

According to the embodiment of the present invention, when the anode potential is higher than the predetermined threshold value, the anode gas is supplied to the anode to purge the anode, so that produced water or an impurity gas residing in the fuel cell (anode) can be blown off by the anode gas. Accordingly, the flooding phenomenon can be solved and the anode gas can be delivered to the entire fuel cell. Consequently, the anode potential can be immediately recovered (reduced), thus preventing degradation of the fuel cell. In addition, since the discharge permission determination is again made after the purge, rapid transition to the discharge process can be achieved when it is determined that the anode potential is at or below the predetermined threshold value.

When the fuel cell has a relatively large size, the anode potential of the entire surface of the fuel cell may not be detected completely. Therefore, if it is determined before the start of discharge that the anode potential is at or below the predetermined threshold value, flooding or the like may actually occur outside a detection area. In such a case, if the discharge process is performed, produced water residing outside the detection area may move into the detection area, thus causing an increase in the anode potential in the detection area.

According to the embodiment of the present invention, therefore, the discharge permission determination is made during the discharge. Thus, the state of the surface of the fuel cell can be determined with higher accuracy.

According to the embodiment of the present invention, if the anode potential cannot be directly measured, whether to permit the discharge process can be made with high accuracy.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system for a vehicle, comprising:
   a fuel cell having an anode and a cathode;
   a fuel supply device to supply a fuel to a fuel flow passage facing the anode;
   an oxidizer supply device to supply an oxidizer to an oxidizer flow passage facing the cathode;
   an anode potential measuring device configured to measure an anode potential of the anode; and a discharge controller configured to control discharge of electric current from the fuel cell as part of a process of stopping the fuel cell during idling of the vehicle,
   wherein, when receiving idle stop permission for the fuel cell, the discharge controller determines whether the fuel cell is permitted to discharge,
   wherein, when the anode potential measured by the anode potential measuring device is equal to or lower than a predetermined threshold value, the discharge controller is programmed to permit the fuel cell to discharge, and, when an anode gas pressure is at or below a predetermined value, the discharge of the fuel cell is terminated, and
   wherein, when the anode potential measured by the anode potential measuring device is higher than the predetermined threshold value, the discharge controller does not permit the fuel cell to discharge.

2. The system according to claim 1, further comprising:
   a purge device to supply the fuel to the fuel flow passage to purge the fuel flow passage,
   wherein, when the anode potential is higher than the predetermined threshold value and the discharge controller does not permit the fuel cell to discharge, the discharge controller controls the purge device to purge the fuel flow passage and again determines whether the fuel cell is permitted to discharge after the fuel flow passage is purged.

3. The system according to claim 1,
   wherein, when the anode potential is higher than the predetermined threshold value during the discharge, the discharge controller terminates the discharge.

4. The system according to claim 1,
   wherein the anode potential measuring device is configured to calculate the anode potential based on a decrease in cell voltage of the fuel cell.

5. A method for controlling stoppage of a fuel cell system for a vehicle, comprising:
   supplying a fuel to a fuel flow passage facing an anode of a fuel cell;

supplying an oxidizer to an oxidizer flow passage facing a cathode of the fuel cell;

measuring an anode potential of the anode;

controlling discharge of electric current from the fuel cell as part of a process of stopping the fuel cell during idling of the vehicle;

determining whether the fuel cell is permitted to discharge when receiving idle stop permission for the fuel cell;

permitting the fuel cell to discharge when the anode potential is equal to or lower than a predetermined threshold value, and terminating the discharge of the fuel cell when an anode gas pressure is at or below a predetermined value; and prohibiting the fuel cell from discharging when the anode potential is higher than the predetermined threshold value.

6. The system according to claim 2, wherein, when the anode potential is higher than the predetermined threshold value during the discharge, the discharge controller unit terminates the discharge.

7. The system according to claim 2, wherein the anode potential measuring device is configured to calculate the anode potential based on a decrease in cell voltage of the fuel cell.

8. The system according to claim 3, wherein the anode potential measuring device is configured to calculate the anode potential based on a decrease in cell voltage of the fuel cell.

9. The system according to claim 6, wherein the anode potential measuring device is configured to calculate the anode potential based on a decrease in cell voltage of the fuel cell.

10. A fuel cell system for a vehicle, comprising:
a fuel cell having an anode and a cathode;
means for supplying a fuel to a fuel flow passage facing the anode;
means for supplying an oxidizer to an oxidizer flow passage facing the cathode;
means for measuring an anode potential of the anode; and
means for controlling discharge of electric current from the fuel cell as part of a process of stopping the fuel cell during idling of the vehicle,
wherein, when receiving idle stop permission for the fuel cell, the discharge controlling means determines whether the fuel cell is permitted to discharge,
wherein, when the anode potential measured by the anode potential measuring means is equal to or lower than a predetermined threshold value, the discharge controlling means permits the fuel cell to discharge, and, when an anode gas pressure is at or below a predetermined value, the discharge of the fuel cell is terminated, and
wherein, when the anode potential measured by the anode potential measuring means is higher than the predetermined threshold value, the discharge controlling means does not permit the fuel cell to discharge.

* * * * *